(12) United States Patent
Mujumdar et al.

(10) Patent No.: US 12,417,230 B2
(45) Date of Patent: Sep. 16, 2025

(54) ANNOTATING AND COLLECTING DATA-CENTRIC AI QUALITY METRICS CONSIDERING USER PREFERENCES

(71) Applicant: INTERNATIONAL BUSINESS MACHINES CORPORATION, Armonk, NY (US)

(72) Inventors: Shashank Mujumdar, Nagpur (IN); Ruhi Sharma Mittal, Bengaluru (IN); Nitin Gupta, Saharanpur (IN); Hima Patel, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/063,929

(22) Filed: Dec. 9, 2022

(65) Prior Publication Data

US 2024/0193166 A1 Jun. 13, 2024

(51) Int. Cl.
| | | |
|---|---|---|
| *G06F 7/00* | (2006.01) | |
| *G06F 16/00* | (2019.01) | |
| *G06F 16/2457* | (2019.01) | |
| *G06F 16/28* | (2019.01) | |

(52) U.S. Cl.
CPC ...... *G06F 16/24573* (2019.01); *G06F 16/285* (2019.01)

(58) Field of Classification Search
None
See application file for complete search history.

(56) References Cited

U.S. PATENT DOCUMENTS

| | | | |
|---|---|---|---|
| 9,898,701 B2 | 2/2018 | Welinder | |
| 10,496,369 B2 | 12/2019 | Guttmann | |
| 11,126,173 B2 | 9/2021 | Cella | |
| 11,366,988 B2 | 6/2022 | Khan | |
| 2008/0147574 A1 | 6/2008 | Chidlovskii | |
| 2015/0058327 A1* | 2/2015 | Frank | G06F 16/284 |
| | | | 707/722 |
| 2016/0224892 A1* | 8/2016 | Sawada | G06N 3/08 |

(Continued)

FOREIGN PATENT DOCUMENTS

EP 3975062 A1 3/2022

OTHER PUBLICATIONS

Li et al., "CrowdRL: An End-to-End Reinforcement Learning Framework for Data Labelling," 37th International Conference on Data Engineering (ICDE), 2021 IEEE, Downloaded on Dec. 31, 2021 from IEEE Xplore, pp. 289-300.

*Primary Examiner* — Tuan A Pham
(74) *Attorney, Agent, or Firm* — Jeffrey M. Ingalls

(57) ABSTRACT

A method, computer program, and computer system are provided for collecting and annotating data based on user preference. Unlabeled data corresponding to one or more entries within a dataset is received. Pseudo-labeled data is generated based on the unlabeled data. Based on one or more quality metrics, each entry from among the pseudo-labeled data is determining to be included within a final dataset. A user is prompted for annotations corresponding to entries of the pseudo-labeled data included within the final dataset. A determination is made as to whether additional data is needed based on comparing the final dataset to the one or more quality metrics, and the additional information is collected if the final dataset does not meet the quality metrics.

15 Claims, 5 Drawing Sheets

(56) References Cited

U.S. PATENT DOCUMENTS

| | | | |
|---|---|---|---|
| 2016/0275417 A1* | 9/2016 | Welinder | G06N 20/00 |
| 2018/0174071 A1* | 6/2018 | Bhatt | G06V 10/774 |
| 2022/0030031 A1* | 1/2022 | Kocsis | H04L 9/3297 |
| 2022/0075805 A1* | 3/2022 | Goodsitt | G06N 3/045 |
| 2022/0101182 A1* | 3/2022 | Patel | G06N 20/00 |
| 2022/0222484 A1 | 7/2022 | Esteva | |
| 2022/0318654 A1* | 10/2022 | Lin | G06N 5/04 |

* cited by examiner

ANNOTATING AND COLLECTING DATA-CENTRIC AI QUALITY METRICS CONSIDERING USER PREFERENCES

FIELD

This disclosure relates generally to field of machine learning, and more particularly to labeling training data for use with machine learning models.

BACKGROUND

Data is a key element of any analysis-based or learning-based task to derive various insights and drive business-critical decisions. In data flow and machine learning model creation, there are several important data phases like data collection/acquisition, data labelling, data recommendation, data cleaning, from which learning pipelines of these models are derived.

SUMMARY

Embodiments relate to a method, system, and computer readable medium for collecting and annotating data. According to one aspect, a method for collecting and annotating data is provided. The method may include receiving unlabeled data corresponding to one or more entries within a dataset. Pseudo-labeled data is generated based on the unlabeled data. Based on one or more quality metrics, each entry from among the pseudo-labeled data is determining to be included within a final dataset. A user is prompted for annotations corresponding to entries of the pseudo-labeled data included within the final dataset. A determination is made as to whether additional data is needed based on comparing the final dataset to the one or more quality metrics, and the additional information is collected if the final dataset does not meet the quality metrics.

According to another aspect, a computer system for collecting and annotating data is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving unlabeled data corresponding to one or more entries within a dataset. Pseudo-labeled data is generated based on the unlabeled data. Based on one or more quality metrics, each entry from among the pseudo-labeled data is determining to be included within a final dataset. A user is prompted for annotations corresponding to entries of the pseudo-labeled data included within the final dataset. A determination is made as to whether additional data is needed based on comparing the final dataset to the one or more quality metrics, and the additional information is collected if the final dataset does not meet the quality metrics.

According to yet another aspect, a computer readable medium for collecting and annotating data is provided. The computer readable medium may include one or more computer-readable storage devices and program instructions stored on at least one of the one or more tangible storage devices, the program instructions executable by a processor. The program instructions are executable by a processor for performing a method that may accordingly include receiving unlabeled data corresponding to one or more entries within a dataset. Pseudo-labeled data is generated based on the unlabeled data. Based on one or more quality metrics, each entry from among the pseudo-labeled data is determining to be included within a final dataset. A user is prompted for annotations corresponding to entries of the pseudo-labeled data included within the final dataset. A determination is made as to whether additional data is needed based on comparing the final dataset to the one or more quality metrics, and the additional information is collected if the final dataset does not meet the quality metrics.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings.

DETAILED DESCRIPTION

Figure 1:
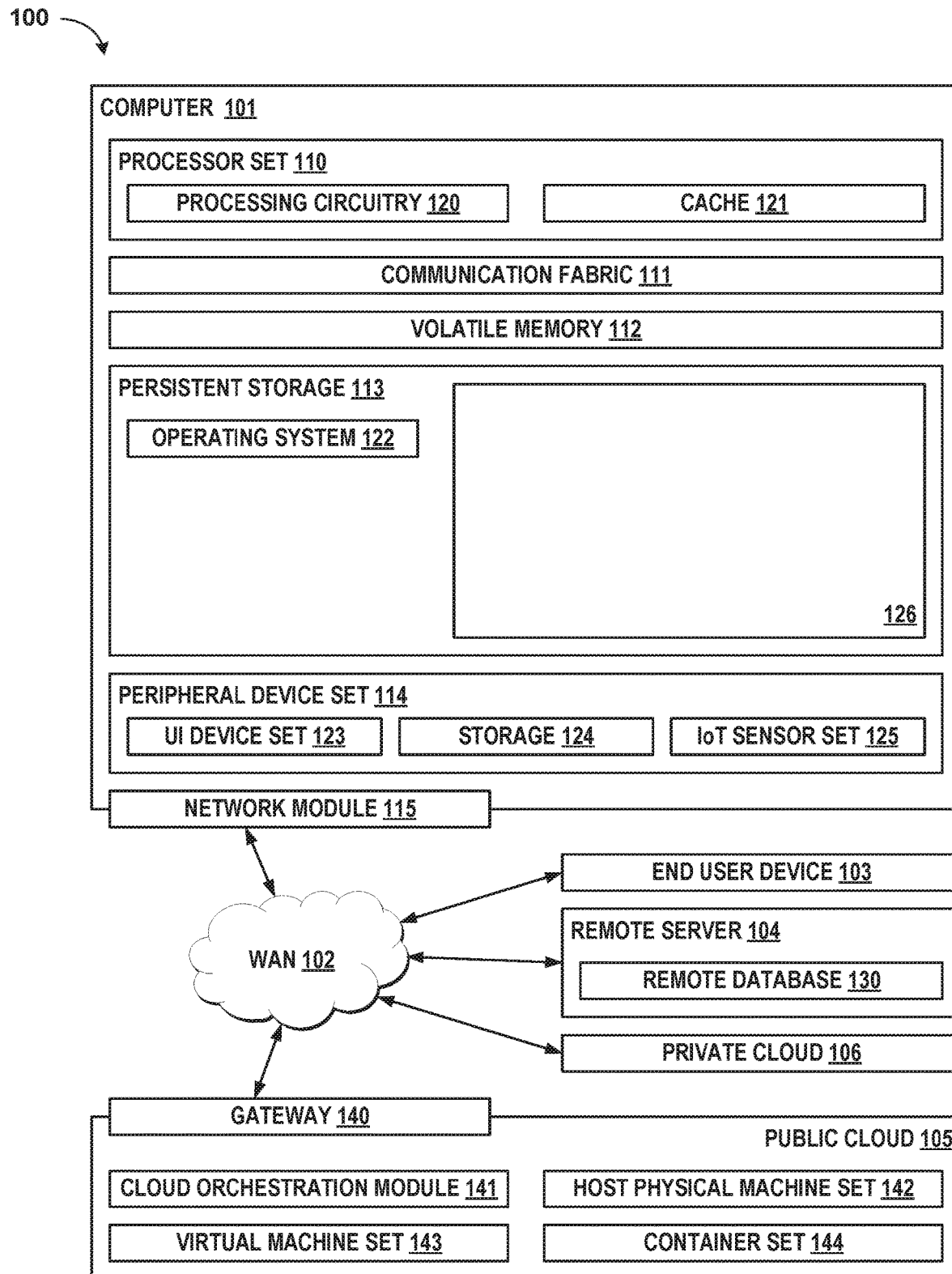
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

Embodiments relate generally to the field of machine learning and artificial intelligence, and more particularly to labeling training data for training and/or use with machine learning models or other analysis-based or learning-based tasks. The following described exemplary embodiments provide a system, method, and computer program to, among other things, collect and annotate data based on user preferences. As one of skill in the art understands, machine learning and artificial intelligence is very data intensive, particularly with regard to training of machine learning/artificial intelligence models. Large amounts of data is used in "training" of machine learning/artificial intelligence models, for the models to, in effect, "learn" patterns from the available data. Labeling of such data by a data scientist, user, domain expert, etc., may become either very expensive or impossible in a realistic timeframe. Therefore, some embodiments have the capacity to improve the field of computing in machine learning/artificial intelligence/etc. by allowing a computer to decide which data samples to annotate to improve the data quality and whether to annotate or collect the new data given a corpus of unlabeled data to optimize overall data quality while minimizing costs of hand annotation. If data acquisition is required, the system, method, and computer program may determine what type of data samples should be collected. Moreover, the system, method, and computer program may capture users' preferences and verify if the data annotation process is sufficient to meet user preferences and correspondingly recommend data collection to help improve the data quality based on user preferences.

As previously described, data is a key element of any analysis-based or learning-based task to derive various insights and drive business-critical decisions. In data flow and machine learning model creation, there are several important data phases like data collection/acquisition, data labelling, data recommendation, data cleaning, from which learning pipelines of these models are derived.

However, in learning pipelines, data scientists often do not have enough labelled data, and the process of labeling a dataset may be an expensive and time-consuming process. For example, during the labelling process, it may become very difficult to decide whether the acquired unlabeled data will be sufficient or whether more data needs to be collected for better quality datasets, and if more data is required then what kind of data should be acquired to improve the quality. For data-centric AI, where the focus is on data rather than modelling, this step becomes of upmost importance. Existing approaches do not decide on which datapoints to label to improve the quality of labelled dataset. During the annotation process, data scientist may not know whether to collect more data or whether labelling the collected data will be sufficient. Moreover, there is no guarantee that even if users annotate all the data the full dataset will be of required quality.

In current systems, data annotation is performed to get the labelled datapoints without considering how it is going to impact the quality of dataset. However, such systems do not provide recommendations on what to annotate or do not provide the set of unlabeled datapoints to annotate in order to improve quality. Additionally, such systems blindly acquire more datasets without considering how such data is going to impact the data quality and simply annotate full datasets. Large, annotated datasets always does not help until and unless it has meaningful content, as well as good quality It may be advantageous, therefore, to automatically decide whether to annotate data or to collect new data given a corpus of unlabeled data to optimize overall data quality. This may be done by determining whether previously annotated samples were useful for quality improvement in order to decide what to annotate influenced by data quality metrics. The embodiments disclosed may capture users' preferences and verify whether the annotation process is sufficient to meet user preferences and correspondingly recommend data collection to help improve the data quality based on user preferences.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following described exemplary embodiments provide a system, method and computer program that collects and annotates data based on user preference. Referring now to FIG. 1, Computing environment 100 contains an example of an environment for the execution of at least some of the computer code involved in performing the inventive methods, such as Data Labeling 126. In addition to Data Labeling 126, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and Data Labeling 126, as identified above), peripheral device set 114 (including user interface (UI) device set 123, storage 124, and Internet of Things (IOT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in Data Labeling 126 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in Data Labeling 126 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
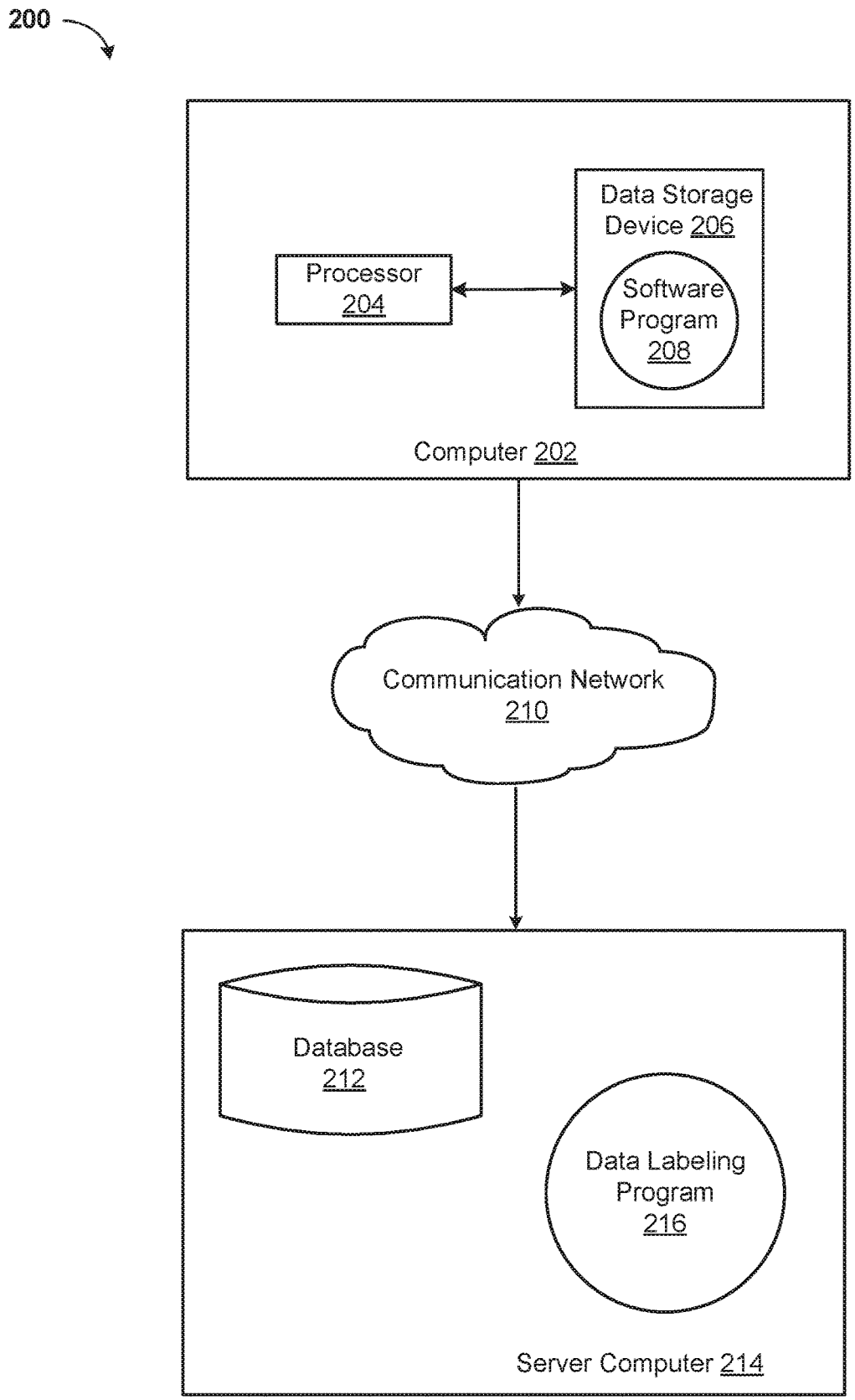
FIG. 2 illustrates a networked computer environment according to at least one embodiment

Referring now to FIG. 2, a functional block diagram of a networked computer environment illustrating a data collection and annotation system 200 (hereinafter "system") for collecting and labeling data based on user preference. It should be appreciated that FIG. 2 provides only an illustration of one implementation and does not imply any limitations with regard to the environments in which different embodiments may be implemented. Many modifications to the depicted environments may be made based on design and implementation requirements.

The system 200 may include a computer 202 and a server computer 214. The computer 202 may communicate with the server computer 214 via a communication network 210 (hereinafter "network"). The computer 202 may include a processor 204 and a software program 208 that is stored on a data storage device 206 and is enabled to interface with a user and communicate with the server computer 214. As will be discussed below with reference to FIG. 5, the computer 202 may include internal components 800A and external components 900A, respectively, and the server computer 214 may include internal components 800B and external components 900B, respectively. The computer 202 may be, for example, a mobile device, a telephone, a personal digital assistant, a netbook, a laptop computer, a tablet computer, a desktop computer, or any type of computing devices capable of running a program, accessing a network, and accessing a database.

The server computer 214, which may be used for collecting and annotating data based on user preference is enabled to run a Data Labeling Program 216 (hereinafter "program") that may interact with a database 212. The database 212, may be among other things, a local database, a cloud store, a single database or combination of databases, an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing etc. The data used by the Data Labeling Program 216 may be bulk, unlabeled data that may be accumulated from a variety of sources and stored within the database 212. The Data Labeling Program 216 is explained in more detail below with respect to FIG. 4. In one embodiment, the computer 202 may operate as an input device including a user interface while the program 216 may run primarily on server computer 214. In an alternative embodiment, the program 216 may run primarily on one or more computers 202 while the server computer 214 may be used for processing and storage of data used by the program 216. It should be noted that the program 216 may be a standalone program or may be integrated into a larger data labeling program.

It should be noted, however, that processing for the program 216 may, in some instances be shared amongst the computers 202 and the server computers 214 in any ratio. In another embodiment, the program 216 may operate on more than one computer, server computer, or some combination of computers and server computers, for example, a plurality of computers 202 communicating across the network 210 with a single server computer 214. In another embodiment, for example, the program 216 may operate on a plurality of server computers 214 communicating across the network 210 with a plurality of client computers. Alternatively, the program may operate on a network server communicating across the network with a server and a plurality of client computers.

The network 210 may include wired connections, wireless connections, fiber optic connections, or some combination thereof. In general, the network 210 can be any combination of connections and protocols that will support communications between the computer 202 and the server computer 214. The network 210 may include various types of networks, such as, for example, a local area network (LAN), a wide area network (WAN) such as the Internet, a telecommunication network such as the Public Switched Telephone Network (PSTN), a wireless network, a public switched network, a satellite network, a cellular network (e.g., a fifth generation (5G) network, a long-term evolution (LTE) network, a third generation (3G) network, a code division multiple access (CDMA) network, etc.), a public land mobile network (PLMN), a private network, an ad hoc network, an intranet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of system 200 may perform one or more functions described as being performed by another set of devices of system 200.

Figure 3:
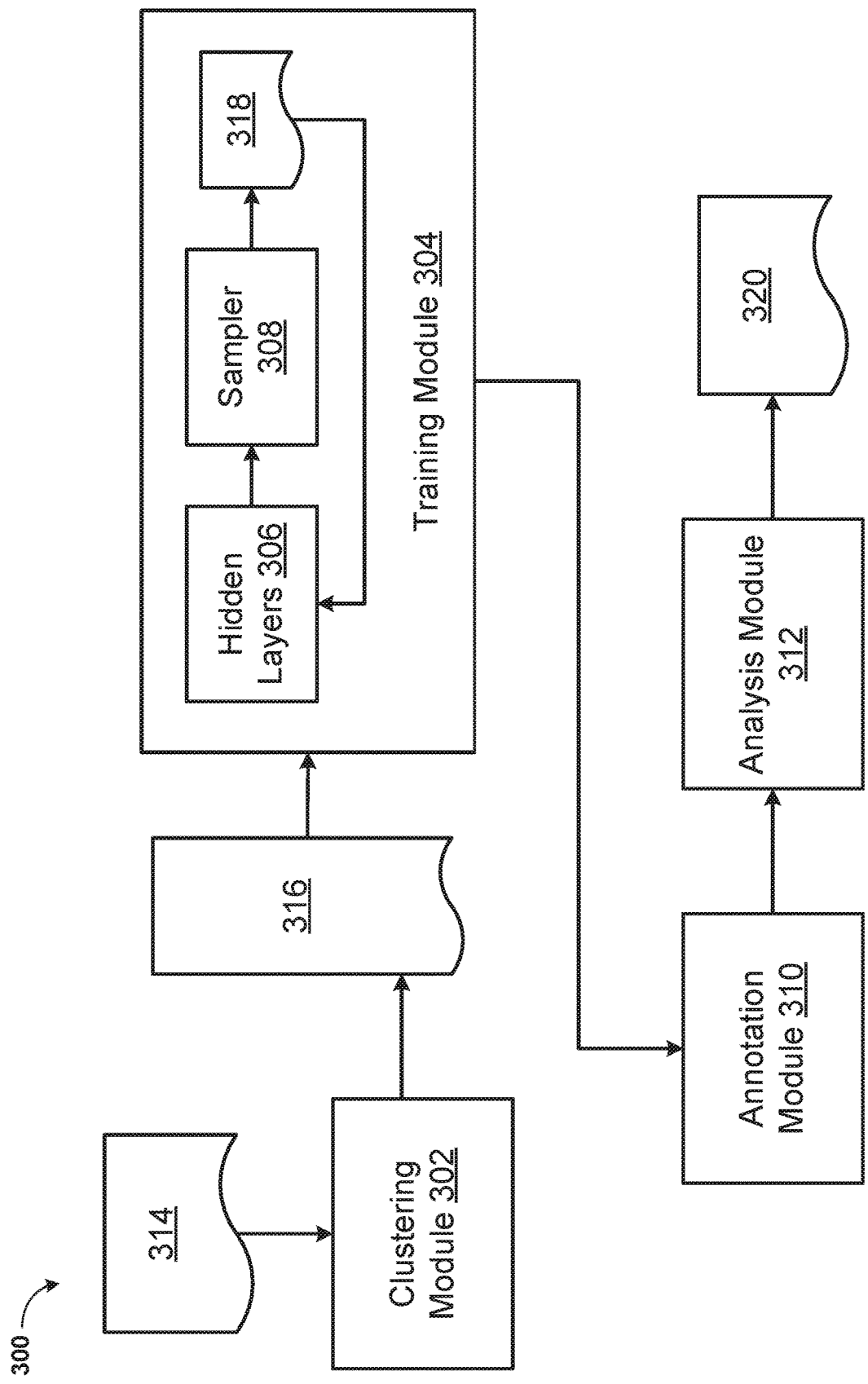
FIG. 3 is a block diagram of a system for data labeling, according to at least one embodiment.

Referring now to FIG. 3, a data labeling system 300 is depicted according to one or more embodiments. The data labeling system 300 may include, among other things, a clustering module 302, a training module 304 that may include hidden layers 306 and a sampler 308, an annotation module 310, and an analysis module 312.

The clustering module 302 may generate pseudo-labels. Given unlabeled data 314, the clustering module 302 may generate pseudo-labels for the unlabeled data 314 to train a machine learning framework. At a first iteration, the clustering module 302 may assign pseudo-labels based on performing unsupervised clustering by an unsupervised machine learning model, whereby the pseudo-labels correspond to cluster assignments for input data samples from among the unlabeled data 314. The clusters may, in various embodiments, be utilized to indicate "similarity" across data, as the pseudo-labels are generated. In one iteration, the pseudo-labels may correspond to categories of the unlabeled data, such as people, objects, locations, etc., such that the pseudo-labels may indicate, for example, that the entries within the unlabeled data may correspond to objects. In another iteration, if the dataset is determined to comprise images of vehicles specifically, the clusters may be generated to indicate sub-types of vehicle, such as red cars, yellow cars, sedans, or trucks. During subsequent iterations, a cluster reassignment may be performed by the clustering module 302 after finding the unsupervised clusters. The clustering module 302 may account for annotations provided by a user, such as if all red cars and yellow cars are labeled this by a user labeling data. The clustering module may either split clusters based on the presence of different class-labeled samples in the same cluster or may merge clusters based on adjacent clusters having the same or similar class-labeled samples. Accordingly, the pseudo-labels may be iteratively improved based on updated annotations at the end of each iteration. For example, the pseudo-labels generated by the unsupervised machine learning model may subsequently be reviewed by a human reviewer who may provide annotations that may be used for improving the quality of the pseudo-labels.

The training module 304 may include, among other things, hidden layers 306 and a sampler 308. The training module 304 may receive pseudo-labeled data 316 generated by the clustering module 302. Given the pseudo-labeled data 316, the training module 304 may select those samples in the data that contribute most to quality scores associated with various data quality metrics, such as label noise, class imbalance, class overlap, and outliers. The hidden layers 306 may correspond to, at least, an input layer and an output layer. However, it may be appreciated that the hidden layers 306 may be substantially any machine learning architecture that may be suitable for performing unsupervised pseudo-labeling of the unlabeled data and may include additional layers between the input layer and output layer. The input layer may correspond to a feature map of input samples. The output layer may correspond to a probability of considering each sample for inclusion in the final dataset. The training module 304 may learn to train the sampler 308, which assigns high probabilities of selection to those samples that contribute most to the data quality metrics based on the pseudo-labels. The quality scores from the various metrics may be normalized to fall between the values of [0, 1] and may serve as the reward mechanism for the training module 304. For example, the training module may rank a set of pseudo-labels having more noise or imbalance as having a lower quality score than a less noisy or more balanced set of pseudo-labels. At the end of training, the sampler 308 picks the samples 318 from the unlabeled set based on the selection probabilities assigned by the training module 304, sampled using a binomial distribution. The number of samples (i.e. batch size) to be annotated can be varied at each iteration based on user preference. The selected set of samples 318 are then passed to the user for acquiring ground truth labels which are used in further iterations to influence the pseudo-labels and the framework.

The annotation module 310 may annotate the samples 318 identified by the training module 304. After completing a pre-defined set of iterations (i.e. n iterations), if there is no improvement observed in the training of the machine learning framework, the analysis module 312 may recommend the user to collect more data if the user preference are not met. After annotating a few batches of data by the annotation module 310 and training the framework by the training module 302, if the sampler 308 is not trained to assign high probabilities to any of the data samples 318, the human annotations are not helping improve the quality of the data and annotating more samples from the existing data is not guaranteed to improve the quality. After n iterations, the analysis module 312 may measure the data quality only with the labeled samples 318 and check if the user preferences are satisfied. If the user preferences are not met and the training module 304 indicates no improvement in learning, the analysis module 312 may recommend to the user to collect more data. As part of the recommendation to the user, the analysis module 312 may provide samples for each metric from the labeled data 320 which contribute most to the data quality metric. The recommended samples for each metric help user identify the type of data that needs to be collected to help improve the quality of the data.

Figure 4:
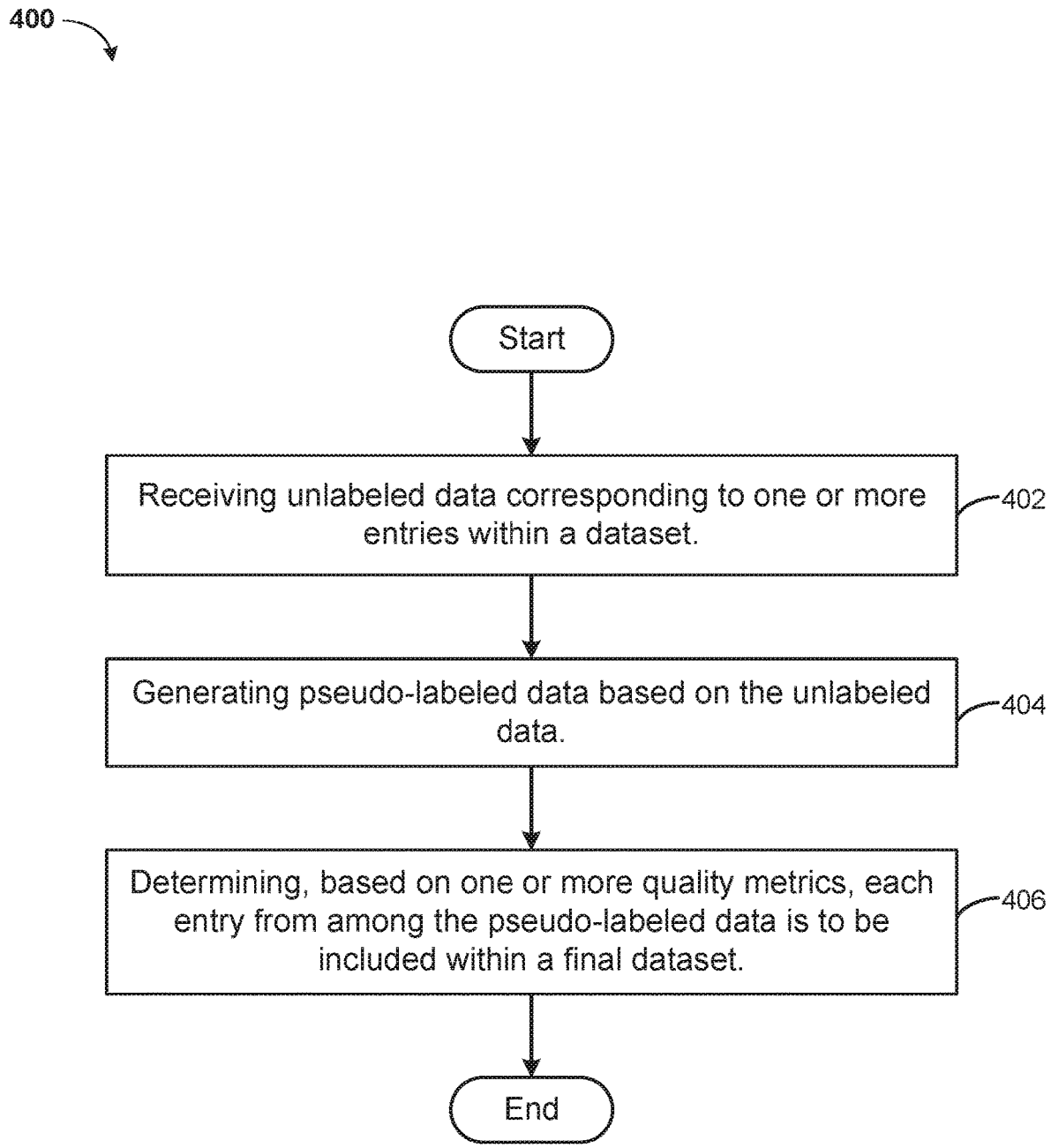
FIG. 4 is an operational flowchart illustrating the steps carried out by a program that collects and annotates data, according to at least one embodiment.

Referring now to FIG. 4, an operational flowchart illustrating the steps of a method 400 carried out by a program that collects and annotates data based on user preference is depicted. The method 400 may be described with the aid of the exemplary embodiments of FIGS. 1-3.

At 402, the method 400 may include receiving unlabeled data corresponding to one or more entries within a dataset. The unlabeled data may correspond to raw data that has not been preprocessed. In operation, the clustering module 302 may receive unlabeled data 314 (FIG. 3) that may include one or more entries within a dataset.

At 404, the method 400 may include generating pseudo-labeled data based on the unlabeled data. The pseudo-labeled data may be generated based on unsupervised clustering of the unlabeled data, such that the pseudo-labels correspond to cluster assignments for input data samples from among the unlabeled data. In operation, the clustering module 302 (FIG. 3) may assign pseudo-labels to the unlabeled data 314 (FIG. 3) in order to generate the pseudo-labeled data 316.

At 406, the method 400 may include determining, based on one or more quality metrics, each entry from among the pseudo-labeled data is to be included within a final dataset. The quality metrics may include, among other things, label noise, class imbalance, class overlap, and outliers. In operation, the pseudo-labeled data 316 (FIG. 3) may be passed to the training module 304 (FIG. 3) for use in selecting samples in the data that contribute most to the data quality metrics. The annotation module 310 (FIG. 3) may annotate the samples identified by the training module, and the analysis module 312 (FIG. 3) may analyze such annotations in order to output labeled data 320 (FIG. 3). The analysis module 312 may also determine whether additional data is needed within labeled data 320 based on comparing the labeled data 320 to the one or more quality metrics. The analysis module 312 may collect any additional data based on the labeled data 320 not meeting the one or more quality metrics. If the quality metrics are met, however, no additional data is collected.

It may be appreciated that FIG. 4 provides only an illustration of one implementation and does not imply any limitations with regard to how different embodiments may be implemented. Many modifications to the depicted environments may be made based on design and implementation requirements.

Figure 5:
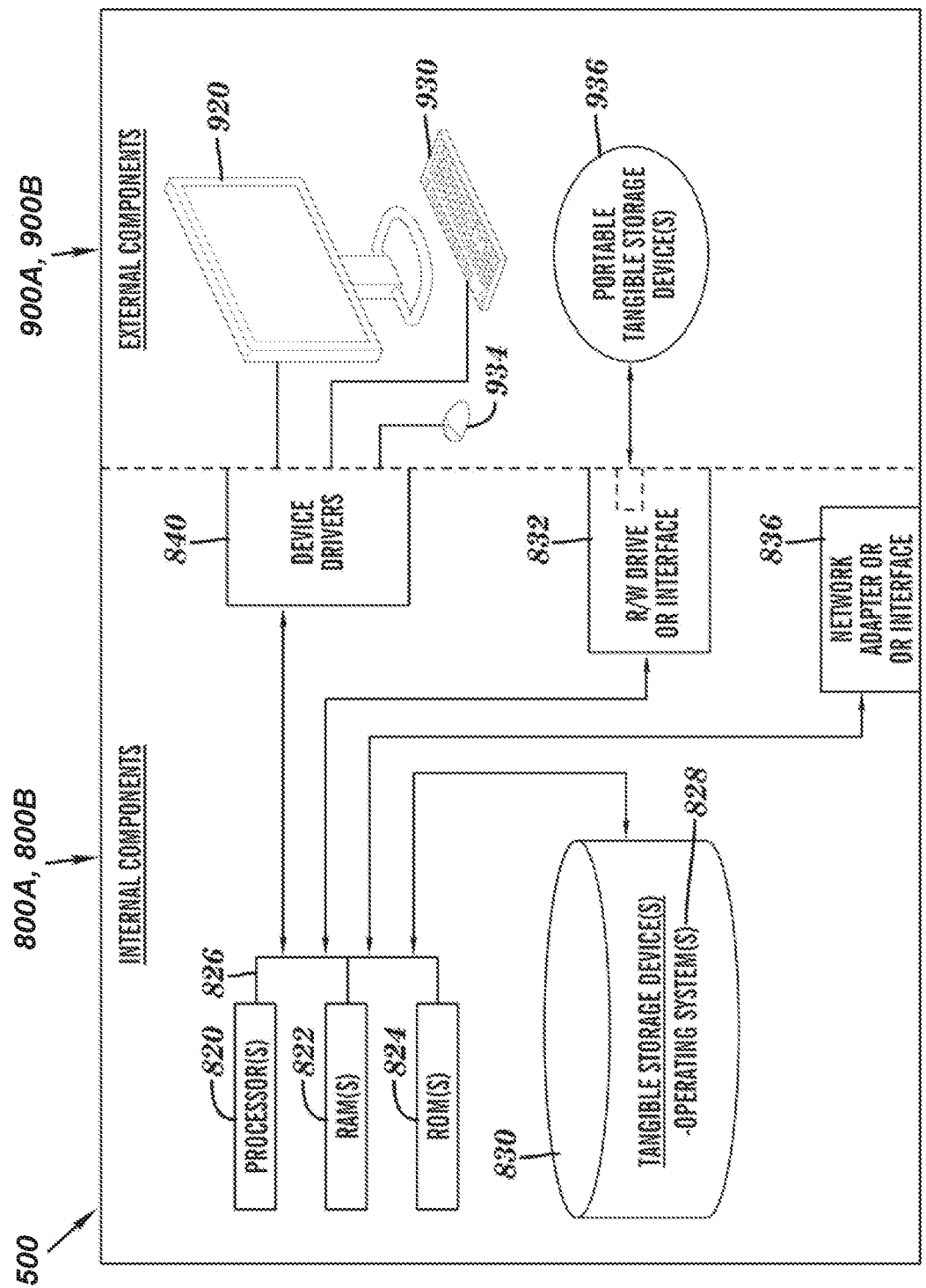
FIG. 5 is a block diagram of internal and external components of computers and servers depicted in FIG. 1 according to at least one embodiment.

FIG. 5 is a block diagram 500 of internal and external components of computers depicted in FIG. 1 in accordance with an illustrative embodiment. It should be appreciated that FIG. 5 provides only an illustration of one implementation and does not imply any limitations with regard to the environments in which different embodiments may be implemented. Many modifications to the depicted environments may be made based on design and implementation requirements.

Computer 202 (FIG. 2) and server computer 214 (FIG. 2) may include respective sets of internal components 800A,B and external components 900A,B illustrated in FIG. 5. Each of the sets of internal components 800 include one or more processors 820, one or more computer-readable RAMs 822 and one or more computer-readable ROMs 824 on one or more buses 826, one or more operating systems 828, and one or more computer-readable tangible storage devices 830.

Processor 820 is implemented in hardware, firmware, or a combination of hardware and software. Processor 820 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 820 includes one or more processors capable of being programmed to perform a function. The one or more buses 826 include a component that permits communication among the internal components 800A,B.

The one or more operating systems 828, the software program 108 (FIG. 2) and the Data Labeling Program 216 (FIG. 2) on server computer 214 (FIG. 2) are stored on one or more of the respective computer-readable tangible storage devices 830 for execution by one or more of the respective processors 820 via one or more of the respective RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory, an optical disk, a magneto-optic disk, a solid-state disk, a compact disc (CD), a digital versatile disc (DVD), a floppy disk, a magnetic tape, and/or another type of non-transitory computer-readable tangible storage device that can store a computer program and digital information.

Each set of internal components 800A,B also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the software program 108 (FIG. 2) and the Data Labeling Program 216 (FIG. 2) can be stored on one or more of the respective portable computer-readable tangible storage devices 936, read via the respective R/W drive or interface 832 and loaded into the respective computer-readable tangible storage device 830.

Each set of internal components 800A,B also includes network adapters or interfaces 836 such as a TCP/IP adapter cards; wireless Wi-Fi interface cards; or 3G, 4G, or 5G wireless interface cards or other wired or wireless communication links. The software program 108 (FIG. 2) and the Data Labeling Program 216 (FIG. 2) on the server computer 214 (FIG. 2) can be downloaded to the computer 202 (FIG. 2) and server computer 214 from an external computer via a network (for example, the Internet, a local area network or other, wide area network) and respective network adapters or interfaces 836. From the network adapters or interfaces 836, the software program 108 and the Data Labeling Program 216 on the server computer 214 are loaded into the respective computer-readable tangible storage device 830. The network may comprise copper wires, optical fibers, wireless transmission, routers, firewalls, switches, gateway computers and/or edge servers.

Each of the sets of external components 900A,B can include a computer display monitor 920, a keyboard 930, and a computer mouse 934. External components 900A,B can also include touch screens, virtual keyboards, touch pads, pointing devices, and other human interface devices. Each of the sets of internal components 800A,B also includes device drivers 840 to interface to computer display monitor 920, keyboard 930 and computer mouse 934. The device drivers 840, R/W drive or interface 832 and network adapter or interface 836 comprise hardware and software (stored in computer-readable tangible storage device 830 and/or ROM 824). Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of collecting and annotating data based on user preference, executable by a processor, comprising:
   receiving unlabeled data corresponding to one or more entries within a dataset;
   generating pseudo-labeled data based on the unlabeled data and based on unsupervised clustering of the unlabeled data;
   receiving user-provided annotations corresponding to entries of the pseudo-labeled data;
   re-clustering the unlabeled data based on the user-provided annotations;
   regenerating the pseudo-labeled data based on the re-clustering;
   determining, based on one or more quality metrics, whether each entry from among the pseudo-labeled data is to be included within a final dataset, wherein the one or more entries are selected by two or more hidden layers corresponding to, at least, an input layer and an output, wherein the input layer corresponds to a feature map of input samples and the output layer corresponds to a probability of considering each entry for inclusion in the final dataset;
   upon determining that user preferences are not met, providing a recommendation to a user to collect additional data, wherein the recommendation includes providing samples to the user from labeled data that contribute most to the one or more quality metrics; and
   receiving additional user-provided annotations corresponding to the samples.

2. The method of claim 1, wherein the unsupervised clustering is performed by an unsupervised machine learning model.

3. The method of claim 1, wherein based on the user-provided annotations, at least one of the clusters are modified in accordance with a selection from the group consisting of:
   (i) split, depending on a presence of different class labelled samples in the same cluster, and
   (ii) merged, if adjacent clusters have the same class labelled samples.

4. The method of claim 1, wherein the one or more quality metrics comprise label noise, class imbalance, class overlap, and outliers.

5. The method of claim 1, further comprising collecting the additional data based on the final dataset not meeting the one or more quality metrics.

6. A computer system for collecting and annotating data based on user preference, the computer system comprising:
   one or more computer-readable non-transitory storage media configured to store computer program code; and
   one or more computer processors configured to access said computer program code and operate as instructed by said computer program code, said computer program code including:
   receiving code configured to cause the one or more computer processors to receive unlabeled data corresponding to one or more entries within a dataset;
   generating code configured to cause the one or more computer processors to generate pseudo-labeled data based on the unlabeled data and based on unsupervised clustering of the unlabeled data;
   receiving user-provided annotations corresponding to entries of the pseudo-labeled data;
   re-clustering the unlabeled data based on the user-provided annotations;
   regenerating the pseudo-labeled data based on the re-clustering;
   determining code configured to cause the one or more computer processors to determine, based on one or more quality metrics, whether each entry from among the pseudo-labeled data is to be included within a final dataset, wherein the one or more entries are selected by two or more hidden layers corresponding to, at least, an input layer and an output, wherein the input layer corresponds to a feature map of input samples and the output layer corresponds to a probability of considering each entry for inclusion in the final dataset;

upon determining that user preferences are not met, providing a recommendation to a user to collect additional data, wherein the recommendation includes providing samples to the user from labeled data that contribute most to the one or more quality metrics; and receiving additional user-provided annotations corresponding to the samples.

7. The computer system claim 6, wherein the unsupervised clustering is performed by an unsupervised machine learning model.

8. The computer system of claim 6, wherein based on the user-provided annotations, at least one of the clusters are modified in accordance with a selection from the group consisting of:

(i) split, depending on a presence of different class labelled samples in the same cluster, and (ii) merged, if adjacent clusters have the same class labelled samples.

9. The computer system of claim 6, wherein the one or more quality metrics comprise label noise, class imbalance, class overlap, and outliers.

10. The computer system of claim 6, further comprising collecting code configured to cause the one or more computer processors to collect the additional data based on the final dataset not meeting the one or more quality metrics.

11. A non-transitory computer readable medium having stored thereon a computer program for collecting and annotating data based on user preference, the computer program configured to cause one or more computer processors to:

receive unlabeled data corresponding to one or more entries within a dataset;

generate pseudo-labeled data based on the unlabeled data and based on unsupervised clustering of the unlabeled data;

receive user-provided annotations corresponding to entries of the pseudo-labeled data;

re-cluster the unlabeled data based on the user-provided annotations;

regenerate the pseudo-labeled data based on the re-clustering;

determine, based on one or more quality metrics, whether each entry from among the pseudo-labeled data is to be included within a final dataset, wherein the one or more entries are selected by two or more hidden layers corresponding to, at least, an input layer and an output, wherein the input layer corresponds to a feature map of input samples and the output layer corresponds to a probability of considering each entry for inclusion in the final dataset;

upon determining that user preferences are not met, providing a recommendation to a user to collect additional data, wherein the recommendation includes providing samples to the user from labeled data that contribute most to the one or more quality metrics; and receiving additional user-provided annotations corresponding to the samples.

12. The computer readable medium of claim 11, wherein the unsupervised clustering is performed by an unsupervised machine learning model.

13. The computer readable medium of claim 11, wherein based on the user-provided annotations, at least one of the clusters are modified in accordance with a selection from the group consisting of:

(i) split, depending on a presence of different class labelled samples in the same cluster, and (ii) merged, if adjacent clusters have the same class labelled samples.

14. The computer readable medium of claim 11, wherein the one or more quality metrics comprise label noise, class imbalance, class overlap, and outliers.

15. The computer readable medium of claim 11, wherein the computer program is further configured to cause the one or more computer processors to collect the additional data based on the final dataset not meeting the one or more quality metrics.

* * * * *